United States Patent [19]

Williams

[11] 4,257,193
[45] Mar. 24, 1981

[54] GRATE LOCK DEVICE

[76] Inventor: Robert C. Williams, Rte. 1, Box 343, Orting, Wash. 98360

[21] Appl. No.: 29,201

[22] Filed: Apr. 12, 1979

[51] Int. Cl.³ .............................................. E05C 21/02
[52] U.S. Cl. ..................................... 49/465; 292/173; 70/144
[58] Field of Search .................. 49/465, 463; 292/273, 292/275, 263; 70/144, 169

[56] References Cited

U.S. PATENT DOCUMENTS

| | | | |
|---|---|---|---|
| 791,381 | 5/1905 | Thompson | 210/532 R |
| 1,035,480 | 8/1912 | Schodde | 210/247 |
| 1,117,250 | 11/1914 | Rothe | 285/179 |
| 1,384,712 | 7/1921 | Shanley | 404/25 |
| 1,542,900 | 6/1925 | Maddocks | 49/465 |
| 1,693,190 | 11/1928 | Benedetti | 49/465 |
| 2,009,132 | 7/1935 | Gehris | 49/465 |
| 2,323,886 | 7/1943 | Wirz, Jr. | 223/83 |
| 2,363,567 | 11/1944 | Blakeman | 292/6 |
| 2,624,307 | 1/1953 | Caffrey | 116/63 |
| 3,674,149 | 7/1972 | Donalson | 210/163 |
| 3,751,949 | 8/1973 | Castle | 70/144 |
| 4,072,331 | 2/1978 | Butterfield et al. | 292/173 |
| 4,142,329 | 3/1979 | Williams | 49/465 |

*Primary Examiner*—Kenneth Downey
*Attorney, Agent, or Firm*—Gregory W. Moravan; Roy E. Mattern, Jr.; David H. Deits

[57] ABSTRACT

A device is disclosed for locking a grate or the like to its receiving frame to make difficult the removal of the grate by an unauthorized person utilizing a makeshift tool. The locking device has a spring loaded latching pin carried by supports secured to the grate. The shoulders provided by either a necked portion of the latching pin or by a flange on the latching pin serve to prevent the unlatching of the latching pin against the biasing of the spring by the use of a makeshift tool. In some embodiments the shoulders are inclined at an angle with respect to the longitudinal axis of the latching pin to encourage the slippage of a makeshift tool off from said shoulders to thereby prevent the unlatching of the pin by an unauthorized person using a makeshift tool. In some embodiments, the unlatching hole in the grate is offset from the locking device to prevent the inspection of the locking device by an unauthorized person seeking to discover the manner of operation of the locking device.

11 Claims, 10 Drawing Figures

GRATE LOCK DEVICE

BACKGROUND OF THE INVENTION

The present invention relates to locking devices for grates and the like, and more particularly to such devices which are vandal resistant due to their construction which prevents the easy unlocking of the device by the use of a makeshift tool.

SUMMARY OF THE INVENTION

As is well known, grates, manhole covers, access hole covers, and the like are frequently removed or stolen by vandals, thereby necessitating their costly replacement. In addition, their removal could result in serious injury to persons or property, particularly if the grate, etc. were located in a sidewalk or roadway. Further, should the manhole cover, access hole cover, or the like shield the contents of a tank, or the like, the unauthorized removal of the cover or the like could result in the contamination of the contents of the tank.

Accordingly, the primary object of the present invention is to provide a simple, durable, low cost, vandal resistant locking device for grates and the like by making the unauthorized unlocking of the grate difficult when a makeshift tool is utilized.

Basically, the present invention comprises a spring loaded latching pin carried by mounting means fastened to the grate or the like. Normally, when the grate or the like is in place on its receiving frame, the spring maintains the latching pin in an extended position to engage the receiving frame and to thereby lock the grate into place in the receiving frame.

In one embodiment, the latching pin has a necked portion, which necked portion provides a pair of shoulders engageable by an authorized unlatching tool having a pair of projections adapted to engage said shoulders. Preferably, said shoulders are inclined at an angle of less than ninety degrees with respect to the longitudinal axis of the latching pin to encourage the slippage of an unauthorized tool from said shoulders, thereby making it highly unlikely that a makeshift tool will be able to grip the latching pin sufficiently to disengage it from the receiving frame against the biasing of the spring.

In another embodiment, said pair of shoulders are provided by a generally radially extending flange on the latching pin. Again, it is preferred that the shoulders provided by said flange be inclined at an angle of less than ninety degrees for the reasons discussed above.

In some embodiments, where said pair of shoulders are provided by a generally radially extending flange on the latching pin, said pair of shoulders are located intermediate the ends of the latching pin and said flange also serves as one of the elements against which said spring acts to bias the latching pin.

In some embodiments of the present invention, the unlatching hole in the grate or the like is offset from the locking device to prevent the easy inspection of the locking device by an unauthorized person seeking to understand how to unlock the grate from the receiving frame. In such case it is preferred that the authorized tool for unlatching the latching pin have a dogleg in its handle to permit its easy engagement with said pair of shoulders despite the offset of the unlatching hole. Of course, such offsetting of the unlatching hole makes it even more unlikely that a makeshift tool could be used by an unauthorized person to disengage the latching pin from the receiving frame against the biasing of said spring.

These and further objects, features, advantages and characteristics of the grate lock device of the present invention will be apparent from the following more detailed description of the preferred embodiments.

BRIEF DESCRIPTION OF THE DRAWINGS

FIG. 1 is an isometric view, partially broken away for clarity, showing an assembled form of the present invention installed on a grate or the like;

FIG. 4 is an elevational view of the present invention shown installed on a cast grate or the like;

DESCRIPTION OF THE PREFERRED EMBODIMENTS

It should be clearly understood that although the present invention is shown in the figures in use with a grate, such as for a catch basin or a sewer system for example, such use is only by way of non-limiting example. It should also be clearly understood that it is intended that the present invention's use not be so limited, and that the grate lock device of the present invention could be used to provide a locking mechanism for other similar articles such as manhole covers, or for any other lid or cover used on any object such as a fuel storage tank, for example. Accordingly, as used herein and particularly in the claims, the term "grate" is defined to include not only grates but also manhole covers, access hole covers, or any other form of cover or lid for any other object, such as fuel storage tanks, for example. Similarly, the term "grate lock device" is defined to mean not only a device for locking grates but also to mean a device for locking manhole covers, access hole covers, or other covers or lids for other objects such as fuel storage tanks, for example.

GRATE LOCK DEVICE WHICH IS ASSEMBLED TO A GRATE OR THE LIKE

Figure 1:
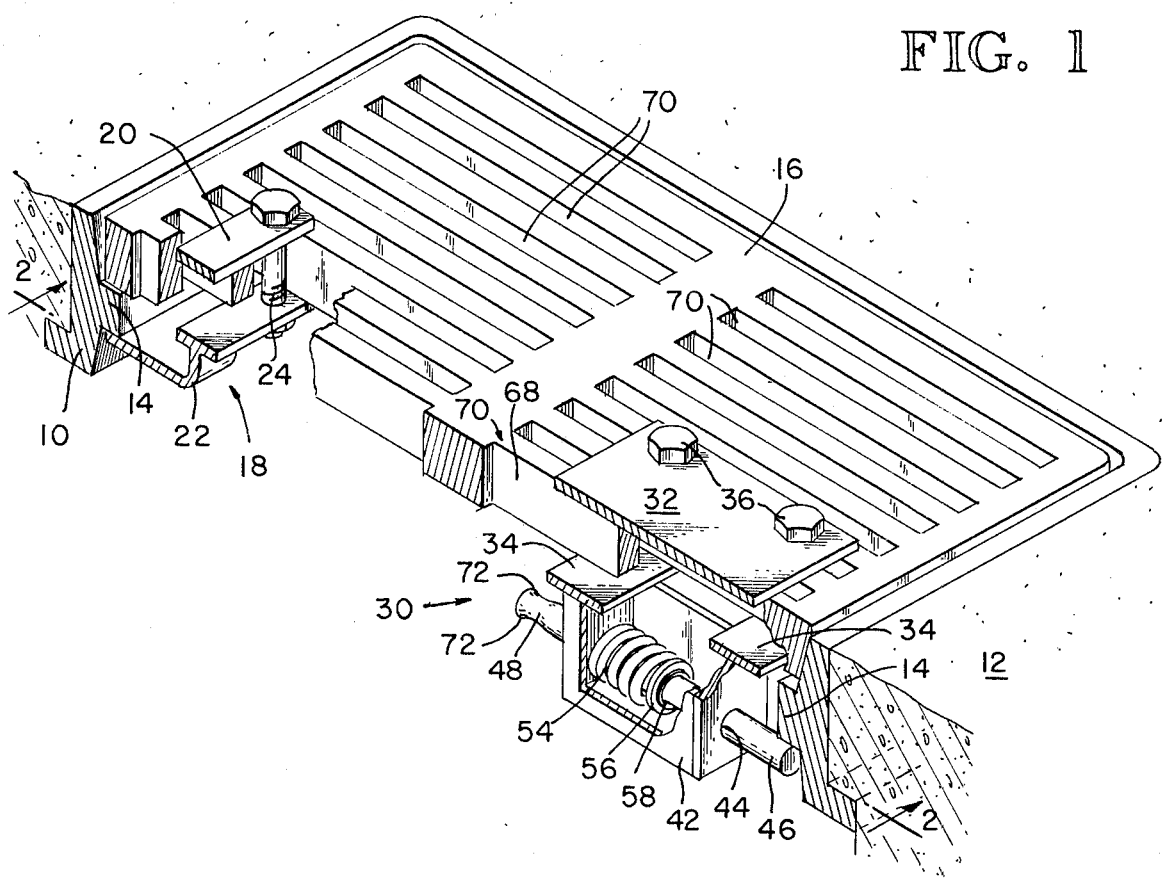
Figure 2:
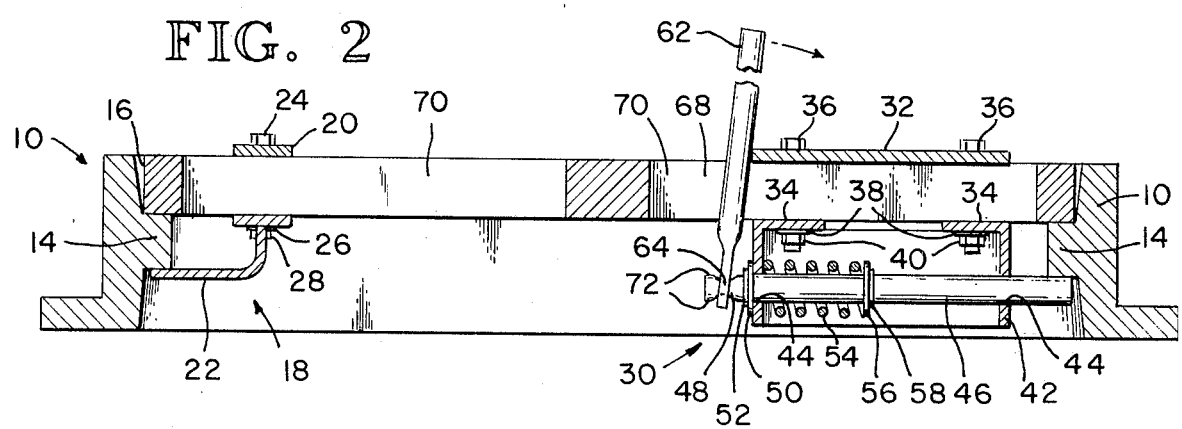
FIG. 2 is a cross-sectional view of the present invention as shown in FIG. 1 taken along line 2—2 thereof.

Referring now to FIGS. 1 and 2, there is shown a receiving frame 10 embedded in a surface 12, such as a sidewalk or roadway. The receiving frame has a flange 14 on its internal surface extending inwardly into the opening defined by the receiving frame, said flange generally extending about the internal circumference of the receiving frame. Resting on top of the flange 14 is a grate 16. Located at one end of the grate is a passive locking mechanism, generally designated at 18, comprising a top plate 20 and a bottom, locking plate 22 held in an assembled relation to the grate by a bolt 24, lock washer 26 and nut 28. As seen in FIGS. 1 and 2, when the grate is in place on the receiving frame's flange 14, one portion of the bottom, locking plate 22 engages the lower surface of the receiving frame flange, thereby locking that end of the grate to the receiving frame.

At the other end of the grate 16 is located the grate lock device of the present invention, generally designated at 30. The grate lock device comprises a top plate 32 and a pair of bottom plates 34 rigidly secured to the grate by a pair of bolts 36, a pair of lock washers 38, and a pair of nuts 40. Affixed to the bottom plates 34, as by welding, is a four-sided box 42 having no bottom or top and having a pair of latching pin holes 44.

Movably carried within the latching pin holes is a latching pin 46 having a necked portion 48 at one end as shown. Secured to the latching pin, adjacent the necked portion, is a washer 50 held in place by a snap ring 52. A spring 54 which encircles the latching pin has one end thereof restrained by a washer 56 and a snap ring 58. Of course, it is understood that the washers could be affixed to the latching pin by other means, such as by welding, for example.

The washer 50 and snap ring 52 adjacent the necked portion 48 of the latching pin serve to prevent the expulsion of the latching pin 46 from the three sided box 42 when the grate 16 is removed from the receiving frame 10. The washer 56 adjacent one end of the spring 54 serves as one of the means against which the spring 54 acts to bias the latching pin to move into an extended position so that one end of the latching pin will interlock with the lower surface of the flange 14 of the receiving frame. The grate lock device is assembled in a manner which will be apparent from an inspection of FIGS. 1 and 2. Both the passive locking mechanism 18 and the grate lock device 30 are preferably constructed from any suitable corrosion resistant, high strength materials.

Figure 3:
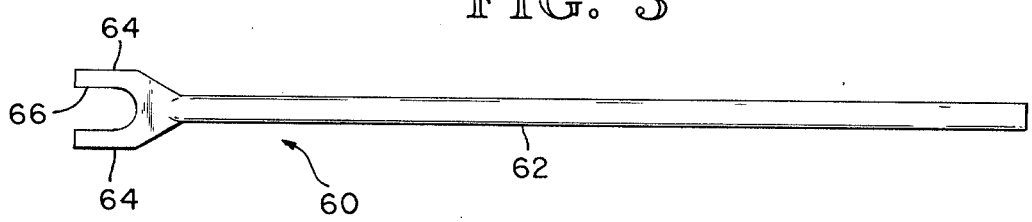
FIG. 3 is an elevational view of one embodiment of the tool used to unlatch the grate lock device of the present invention.

In order to disengage the latching pin 46 from the flange 14 on the receiving frame, the unlatching tool, generally designated at 60, shown in FIG. 3 is utilized. The tool comprises a handle portion 62 which may be of cylindrical configuration, and has at one end a pair of projections 64 defining therebetween a recess 66 sized and adapted to snugly engage the necked portion 48 of the latching pin.

To disengage the latching pin of the grate lock device from the flange 14 on the receiving frame, the tool 60 is first inserted into an unlatching hole 68, in this case defined by one of the slots 70 already present in the grate. After the tool is inserted into the unlatching hole, its projections 64 are placed over the necked portion 48 of the latching pin, thereby securely gripping the latching pin. By moving the handle of the tool in the direction shown in FIG. 2, it is seen that the tool's handle contacts the edge of the unlatching hole 68, which edge acts as a fulcrum for the tool permitting the tool to urge the latching pin 46, against the biasing of the spring 54, free of the flange 14 on the receiving frame, thereby permitting removal of the grate 16 from the receiving frame 10. In order to lock the grate 16 to the receiving frame 10, a reverse procedure is used, which procedure will be obvious from the preceding explanation.

It is important to note that the necked portion 48 of the latching pin, as best seen in FIGS. 1 and 2, preferably has a smoothly rounded contour to provide a pair of shoulders 72 which the projections 64 on the unlatching tool 60 may engage when the tool is used to disengage the latching pin 46 from the flange 14 on the receiving frame. As shown in the figures, the shoulders 72 on the necked portion of the latching pin, besides being rounded, are preferably inclined at an angle of less than 90 degrees with respect to the longitudinal axis of the latching pin. As will be evident from the foregoing description, it is highly unlikely that a makeshift tool utilized by an unauthorized person could be used to sufficiently engage the rounded, inclined shoulders 72 on the latching pin so as to move the latching pin free of the flange 14 on the receiving frame against the biasing of the spring 54. However, although it is not preferred, the shoulders 72 on the necked portion 48 of the latching pin could be at right angles to the longitudinal axis of the latching pin and need not be smoothly rounded. Of course, it is preferred that the spring 54, which may be an automotive engine's valve spring, be quite resilient to further make it likely that a makeshift tool used by an unauthorized person will be unable to sufficiently engage the necked portion 48 of the latching pin to disengage the latching pin from the flange 14 on the receiving frame.

GRATE LOCK DEVICE WHICH IS SECURED TO A GRATE HAVING INTEGRAL SUPPORT STRUCTURES

Referring now to FIGS. 4–7 and 9–10, it is understood that the grate, 100, when in place in the receiving frame 102, rests on the inwardly extending flange 104 of the receiving frame which is, in turn, embedded in the roadway or sidewalk as was the receiving frame shown in FIGS. 1 and 2. At one end of the grate is a depending passive locking ear 106 integrally formed with the grate, said locking ear engaging the flange 102 on the receiving frame when the grate is in place on the receiving frame.

The grate lock device shown in FIGS. 4–7 and 9–10, is generally designated at 108. As shown in these figures, integrally formed with the grate 100 are a pair of supports 110 each of which defines a latching pin hole 112 to receive the latching pin 114.

As seen in the embodiments shown in FIGS. 4–6 and 9, the latching pin has a necked portion 116 defining a pair of shoulders 118. The construction, purpose, and functioning of the necked portion 116 and the pair of shoulders 118 is the same as that previously described with respect to the corresponding elements 48 and 72, respectively, of the embodiment of the present invention shown in FIGS. 1 and 2. Adjacent the necked portion 116 of the latching pin are a washer 120 and a snap ring 122, the snap ring serving to hold the washer in place on the latching pin 114. Encircling the latching pin is a spring 124, one end of which acts against a washer 126 held in place by a snap ring 128. The spring 124 preferably has the characteristics previously described with respect to the spring 54 shown in FIGS. 1 and 2.

Figure 4:
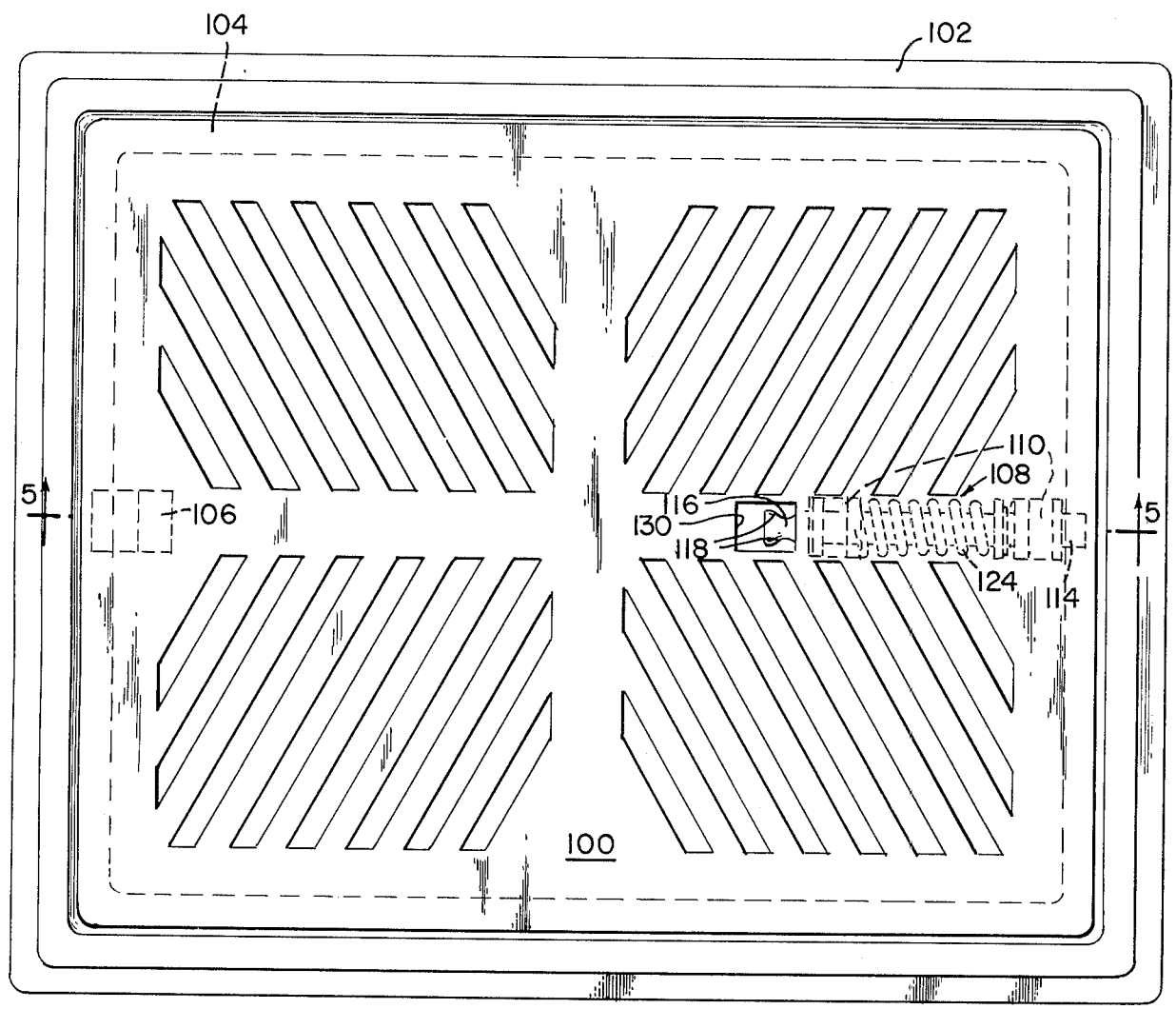
Figure 5:
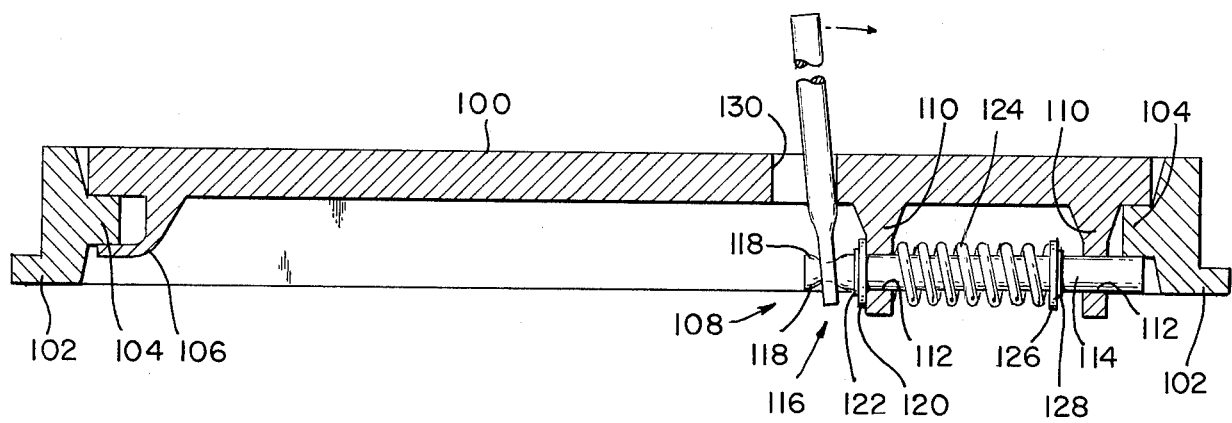
FIG. 5 is a cross-sectional view of the invention shown in FIG. 4 taken along line 5—5 thereof.
Figure 6:
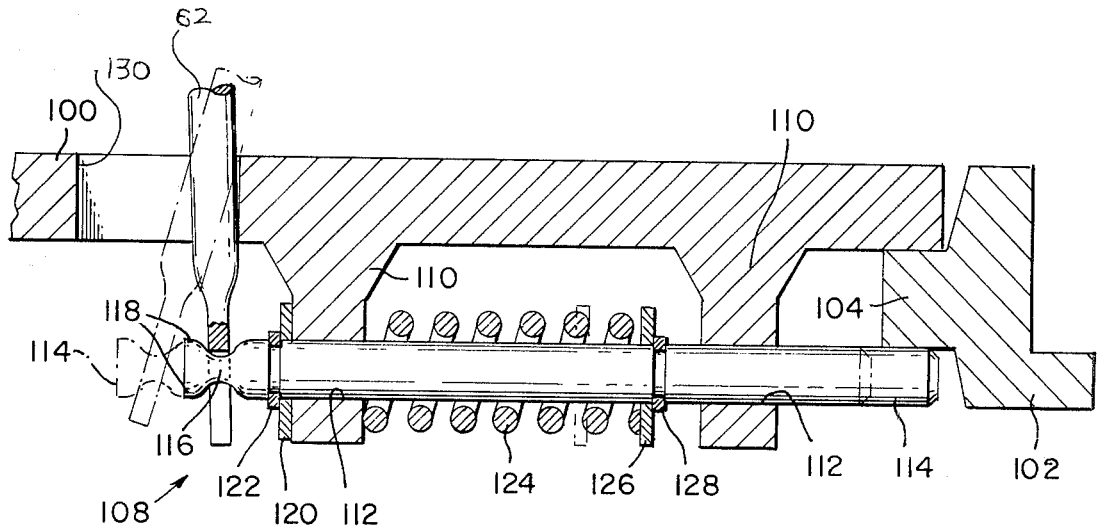
FIG. 6 is a view on an enlarged scale of the right side of FIG. 5 showing the grate lock device of the present invention in detail.

Referring now to the embodiment of the present invention shown in FIGS. 4–6, an unlatching hole 130 is provided in the grate 100 through which the unlatching tool 60, shown in FIG. 3, can be inserted to disengage the latching pin 114 from the flange 104 on the receiving frame 102, as was previously discussed with respect to the embodiment shown in FIGS. 1 and 2. Of course, in the embodiment shown in FIGS. 5 and 6, the snap rings 122 and 128 could be eliminated by welding the washers 120 and 126 directly to the latching pin 114.

Figure 7:
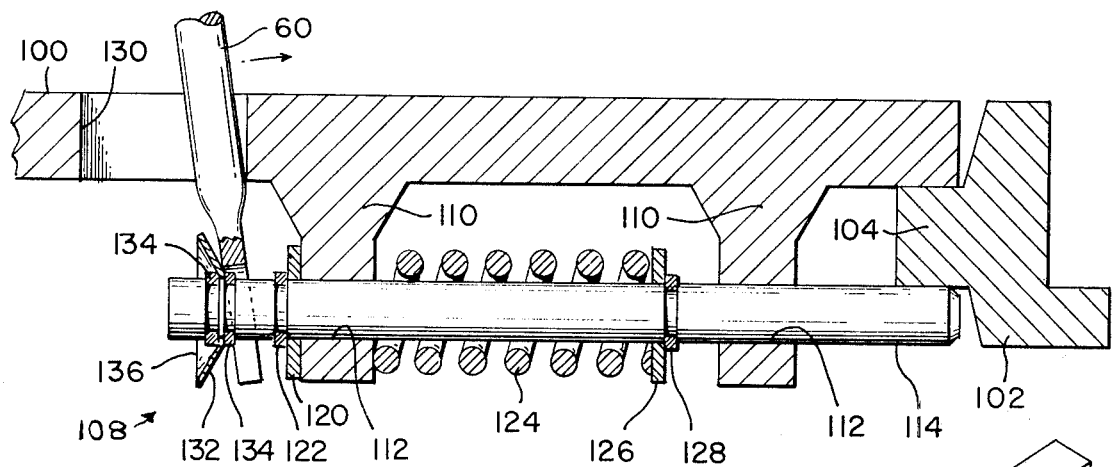
FIG. 7 is a view like FIG. 6 showing an alternative embodiment of the present invention.

Turning now to the embodiment of the present invention shown in FIG. 7, those elements which correspond to those of the embodiment shown in FIGS. 4-6 have been given the same reference numerals. As will be apparent from an inspection of FIG. 7, the only difference between the embodiment illustrated therein and the embodiment shown in FIGS. 4-6 is that the necked portion 116 of the latching pin 114 shown in FIGS. 4-6 has been eliminated and replaced by a structure which will now be discussed.

Referring now to FIG. 7, instead of having a necked portion 116 on the latching pin 114, a conical washer 132 is substituted therefore, said conical washer being held in place by a pair of snap rings 134 as shown, or by welding. As seen, the conical washer 132 is, in effect a flange on the latching pin and provides a pair of shoulders 136, one being seen, while the other being shown cut away.

Preferably, as shown, the shoulders 136 are inclined at an angle of less than 90 degrees with respect to the longitudinal axis of the latching pin to encourage the slippage of a make-shift tool utilized by an unauthorized person, thereby preventing the unauthorized removal of the grate 100.

Although it is preferred that the shoulders 136 of the conical washer be inclined at an angle, as shown, it is possible that an ordinary flat washer could be substituted for the conical washer, thereby making the shoulders provided by the flat washer being at an angle of about 90 degrees with respect to the longitudinal axis of the latching pin.

The same tool 60 as shown in FIG. 3 is used to disengage the latching pin 114 from the flange 104 on the receiving frame 102 in a manner as has been previously described. The only difference is that the recess 66 defined by the projections 64 on the end of the tool 60 will have to be of a diameter sufficient to accommodate the full thickness of the latching pin 114 and snap ring 134, or if no snap ring 134 is used, as when the washer is welded in place, the recess 64 defined by the projections 64 would be of a diameter sufficient to accommodate the latching pin 114.

Figure 9:
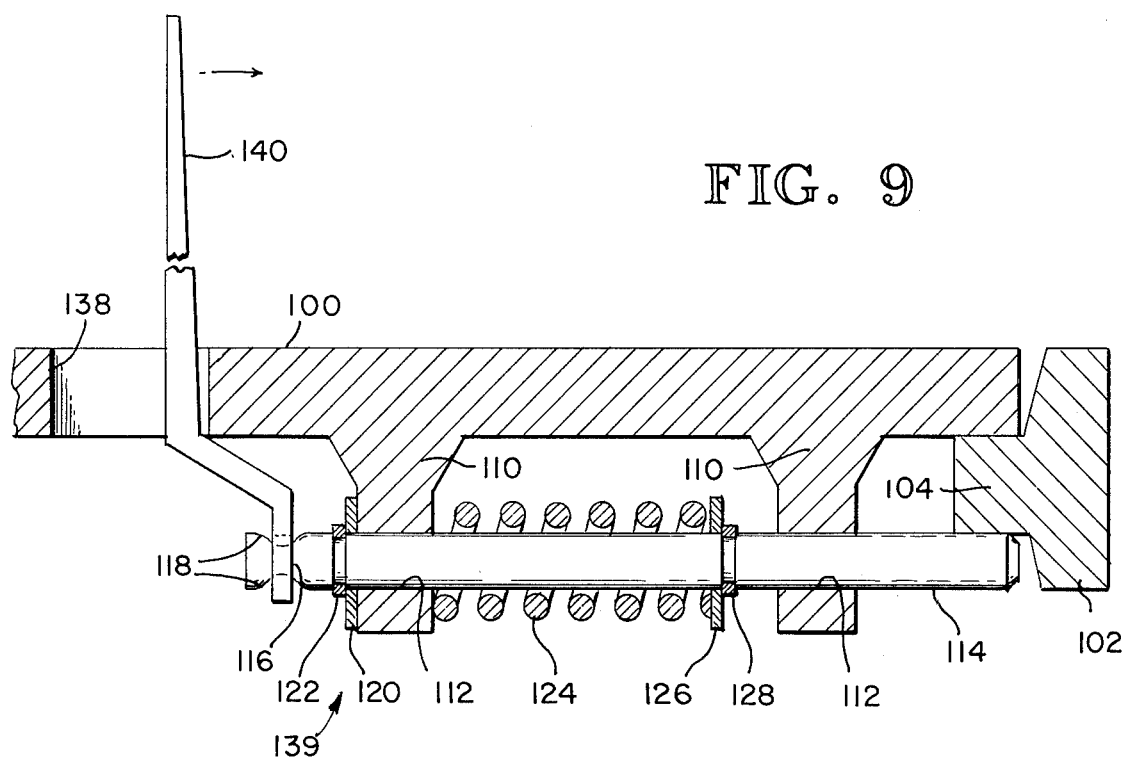
FIG. 9 is a view like that of FIG. 6 showing another embodiment of the present invention and showing the use of the tool shown in FIG. 8.

Referring now to the embodiment of the grate lock device of the present invention shown in FIG. 9, it will be appreciated that it is identical to the embodiment shown in FIGS. 4-6 except that the unlatching hole 138 has been offset from the end of the latch 114 of the grate lock device 139 a distance sufficient to prevent the easy inspection of the grate lock device 139 by an unauthorized person seeking to ascertain the manner of operation thereof. Corresponding elements of the FIG. 9 embodiment have been given the same reference numerals as those in the embodiment shown in FIGS. 4-6.

Figure 8:
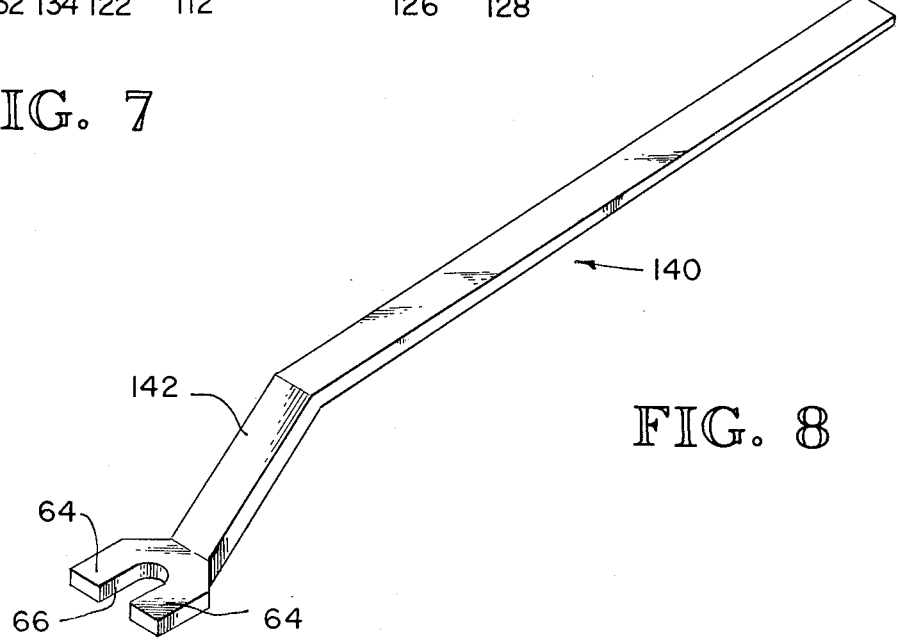
FIG. 8 is an isometric view of a tool preferably used with the embodiment of the grate lock device of the present invention shown in FIG. 9.

When the unlatching hole 138 is offset as shown in FIG. 9, it is preferred that the unlatching tool 140 shown in FIG. 8 be used therewith, although it is possible that the unlatching tool 60 shown in FIG. 3 could be used. As seen, the tool shown in FIG. 8 is generally identical to that shown in FIG. 3 except that it has a dogleg 142 in the handle portion of the tool which permits the tool to easily engage the necked portion 116 of the unlatching pin 114. Once the tool 140 is engaged with the necked portion of the latching pin 114, the manner of disengaging the latching pin from the flange 104 on the receiving frame 102 is as has been previously discussed.

It should be expressly understood that in the embodiment shown in FIG. 9, the necked portion 116 of the latching pin could be eliminated and replaced by the conical washer 132, which is in effect a flange on the latching pin, and a pair of snap rings 134 as shown in the embodiment of FIG. 7 and as previously described. Of course, such a conical washer 132 could be replaced by a flat washer as was also previously discussed, and the tool 60 modified as was discussed above with reference to the embodiment shown in FIG. 7.

Figure 10:
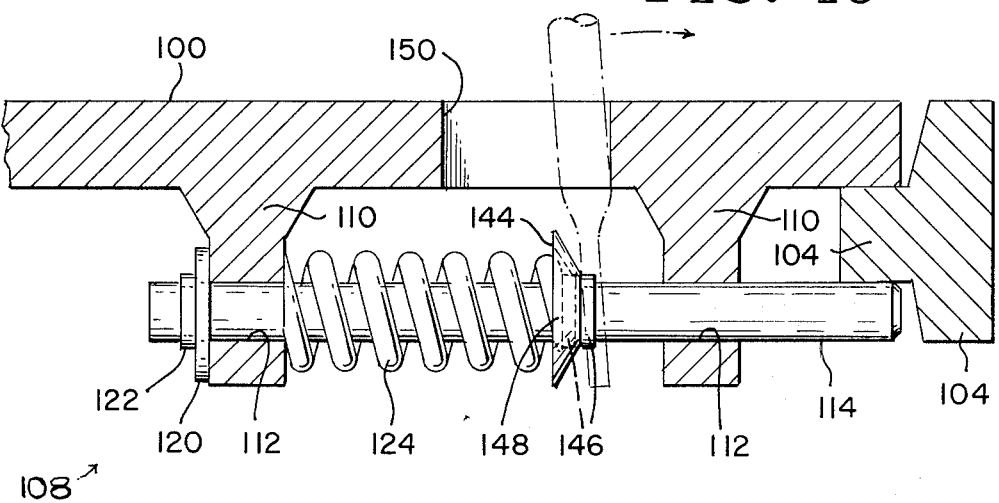
FIG. 10 is a view similar to that shown in FIG. 6 showing another embodiment of the present invention.

Turning now to the embodiment shown in FIG. 10, its' structure is generally similar to that of the embodiment shown in FIGS. 4-6 and corresponding elements have been given the same reference numerals. It is noted that in the embodiment shown in FIG. 10 there is no necked portion at the left end of the latching pin. At the right hand side of the spring 124 shown in FIG. 10, a conical washer 144 is held in place by a pair of snap rings 146. The washer 144 provides, in effect a flange on the latching pin. As seen, the conical washer 144 provides a pair of shoulders 148, one being seen while the other being on the diametrically opposed side of the conical washer. As shown, the shoulders 148 are inclined at an angle of less than 90 degrees with respect to the longitudinal axis of the latching pin 114 to prevent the easy disengagement of the latching pin from the flange 104 on the receiving frame 102 by the use of a makeshift tool utilized by an unauthorized person seeking to remove the grate 100 from the receiving frame by the use of a makeshift tool.

As was discussed previously, the conical washer 144 could be replaced by a flat washer, with the conical 144 or flat washer being held in place by welding to the latching pin rather than by the snap rings 146 illustrated. The tool 60 shown in FIG. 3 is utilized, after being inserted into unlatching hole 150 to disengage the latching pin 114 from the flange 104 on the receiving frame 102 in the manner previously described.

However, it is understood that the recess 66 defined by the projections 64 on the tool would have to be sized to accommodate the diameter of the latching pin 114 and snap ring 146. As seen the unlatching hole 150 is located so as to permit access of the tool 60 to the conical washer 144.

It is to be expressly understood that instead of the conical washer 144 or the flat washer, as previously discussed, providing the shoulders 148 against which the tool operates, such shoulders 148 could be provided by a necked portion of the latching pin adjacent the right hand side of the washer 144 and snap ring 146. Of course, in such event, the tool 60 shown in FIG. 3 could be used as previously described to engage such a necked portion of the latching pin 114 to disengage the latching pin from the flange 104 on the receiving frame 102 and permit the removal of the grate from the receiving frame.

In the embodiments shown in all of the figures, it is preferred that the grate 16, 100 be cast from ductile or modular steel ASTM specification A-536-72 grade 80-55-06.

From the foregoing, various further applications, modifications and adaptations of the apparatus disclosed by the foregoing preferred embodiments of the present invention will be apparent to those skilled in the art to which the present invention is addressed within the scope of the following claims.

I claim:

1. An improved, vandal resistant, grate lock device of the type comprising a grate adapted to fit into a grate receiving frame means;
   wherein said receiving frame means has a frame flange means extending inwardly into the opening defined by said receiving frame means;
   wherein said grate lock device is of the type further comprising:
   at least one mounting means carried by the grate;
   a latching means carried by said mounting means; and
   a means for biasing said latching means to interlock with said frame flange means when said grate is seated on said receiving frame means; and
   wherein said grate further includes an unlatching hole defined by said grate to permit access to said latching means; wherein the improvement comprises:
   said latching means including a latching member having a top face facing towards said unlatching hole, and a pair of side faces located on opposite sides of said latching member at an angle with respect to said top face; wherein said top and pair of side faces are inclined at an angle of less than 90 degrees with respect to the longitudinal axis of said latching member at a location adjacent to said top and side faces; wherein the inclination of said top and pair of side faces is for preventing the movement of said latching means against the biasing of said means for biasing by an unauthorized, make-shift tool; and wherein said pair of inclined side faces are adapted to be engaged by an authorized unlatching tool having a pair of working faces adapted to engage said pair of side faces.

2. An improved, vandal resistant, grate lock device of the type for a grate adapted to fit into a grate receiving frame means;
   wherein said receiving frame means has a frame flange means extending inwardly into the opening defined by said receiving means;
   wherein said grate lock device is of the type comprising:
   at least one mounting means carried by the grate;
   a latching means carried by said mounting means; and
   a means for biasing said latching means to interlock with said frame flange means when said grate is seated on said receiving frame means; and
   wherein said grate further includes an unlatching hole defined by said grate to permit access to said latching means;
   wherein the improvement comprises:
   said latching means having a latching member having a top face facing towards said unlatching hole, and a pair of side faces located on opposite sides of said latching member at an angle with respect to said top face; wherein said top and pair of side faces are inclined at an angle of less than 90 degrees with respect to the longitudinal axis of said latching member at a location adjacent said top and side faces; wherein the inclination of said top and side faces is for preventing the movement of said latching means against the biasing of said latching means for biasing by an unauthorized, make-shift tool; and wherein said pair of inclined side faces are adapted to be engaged by an authorized unlatching tool having a pair of working faces adapted to engage said pair of side faces.

3. The apparatus according to claims 1 or 2, wherein said top and pair of side faces are located on the exterior of said latching member.

4. The apparatus according to claims 1 or 2, wherein said pair of side faces are at about a 90 degree angle with respect to said top face.

5. The apparatus according to claims 1 or 2, wherein said pair of side faces are at less than a 90 degree angle with respect to said top face.

6. The apparatus according to claims 1 or 2, wherein said top face and said pair of side faces are provided by a portion of said latching member which is larger than an adjacent portion of said latching member.

7. The apparatus according to claims 1 or 2, wherein said top face and said pair of side faces are provided by a necked portion of said latching member.

8. The apparatus according to claims 1 or 2, wherein said top face and said pair of side faces are provided by a conical washer means secured to said latching member.

9. The apparatus according to claims 1 or 2, wherein said unlatching hole is located opposite said top face and said pair of side faces so said top face and pair of side faces may be easily viewed through said unlatching hole to enable the user of said authorized unlatching tool to easily engage said unlatching tool with said pair of side faces.

10. The apparatus according to claims 1 or 2, wherein said unlatching hole is offset from said top face and said pair of side faces so said top face and pair of side faces cannot be viewed directly through said unlatching hole; and wherein said authorized unlatching tool is provided with a dog leg to permit its said pair of working faces to be adapted to engage said pair of side faces despite said offset of said unlatching hole from said top face and said pair of side faces, to prevent an unauthorized person from inspecting said latching member to determine how it operates.

11. The apparatus according to claims 1, 2, or 9, further comprising said unlatching tool.

* * * * *